United States Patent [19]

Colinet et al.

[11] 4,249,427
[45] Feb. 10, 1981

[54] MANIPULATING ARRANGEMENT WITH MULTIPLE FUNCTIONS, PARTICULARLY FOR THE AIR-CONDITIONING OF VEHICLES

[75] Inventors: Andre Colinet, Puteaux; Christian Schwartz, Boulogne; Jean-Pierre Francois, Velizy, all of France

[73] Assignee: Regie Nationale des Usines Renault, Boulogne-Billancourt, France

[21] Appl. No.: 907,732

[22] Filed: May 19, 1978

[51] Int. Cl.³ .................... G05G 9/02; F16H 21/44
[52] U.S. Cl. ................................. 74/471 R; 74/103
[58] Field of Search ......................... 74/103, 471 R

[56] References Cited

U.S. PATENT DOCUMENTS

| | | | |
|---|---|---|---|
| 2,198,635 | 4/1940 | Rossman | 74/103 |
| 2,341,741 | 2/1944 | Putnam | 74/103 X |
| 2,634,670 | 4/1953 | Simons | 98/2 |
| 2,851,898 | 9/1958 | Hasty | 74/471 R |
| 3,355,960 | 12/1967 | Bureck et al. | 74/471 R |
| 3,490,518 | 1/1970 | Herbon | 165/42 |
| 4,030,379 | 6/1977 | Colinet | 74/103 |

FOREIGN PATENT DOCUMENTS

| | | |
|---|---|---|
| 2418226 | 4/1974 | Fed. Rep. of Germany . |
| 2519213 | 4/1975 | Fed. Rep. of Germany . |
| 1348211 | 11/1963 | France . |
| 2026048 | 12/1969 | France . |
| 2037584 | 12/1970 | France . |
| 2229568 | 5/1974 | France . |

Primary Examiner—Allan D. Herrmann
Attorney, Agent, or Firm—Oblon, Fisher, Spivak, McClelland & Maier

[57] ABSTRACT

A main T-shaped lever 3 is articulated at the ends of its horizontal arm on two links 5, 6 mounted so as to pivot on a support plate 1 in such a way that the four axes of articulation A, B, C, D form a deformable isosceles trapezoid when the main lever is in the central position E of its travel which, moreover, is parallel to the front 2 of the plate. Secondary levers 9, 10 actuated by cams 5a, 5b, 6a, 6b act on the air-conditioning controls 13, 14.

Particular application is to the case of multiple controls manipulated by a single lever with a large straight displacement with no deflection.

9 Claims, 4 Drawing Figures

MANIPULATING ARRANGEMENT WITH MULTIPLE FUNCTIONS, PARTICULARLY FOR THE AIR-CONDITIONING OF VEHICLES

BACKGROUND OF THE INVENTION

Field of the Invention

The present invention, relates to arrangements for regulating the functions of treatment and distribution of the air for the air-conditioning of automobiles and, in particular, to a manipulating arrangement with multiple functions controllable by a single lever.

The increasing of comfort in automobiles requires improvement of their air-conditioning, but multiplies the regulating controls. In addition, the incorporation of these different controls in a reduced space and the elimination of control levers projecting into the vehicle interior to satisfy safety norms pose a special problem for car makers.

DESCRIPTION OF THE PRIOR ART

In certain known manipulating arrangements, a main lever pivots about an axis integral with a support plate and acts on one or more secondary levers or links, alternately entrained or disengaged according to a preestablished law of regulation. The accessible part of the main lever traverses a front essentially perpendicular to the support and describes a trajectory along a circular arc which is longer the larger the number of controls to manipulate, which leads to a considerable projection beyond the front. One solution consists of placing the center of rotation of the main lever farther from the front so as to reduce the projection, for the same lever travel, to an amount permitted by the safety norms. But this solution leads rapidly to bulkiness of the control device incompatible with the space available.

SUMMARY OF THE INVENTION

The aim of the invention is to avoid the drawbacks mentioned above and to realize a manipulating arrangement with multiple functions permitting, in a reduced space, to regulate successively or simultaneously several air-conditioning functions by means of a single control lever moving essentially parallel to the front of the device and this over a distance large relative to its geometric dimensions.

To this end, the invention has as its object a manipulating arrangement with multiple functions particularly for the regulation of the air-conditioning of automobiles, comprising a main lever pivoting about at least one fixed axis integral with a support plate and the accessible end of which moves essentially parallel to the front of the said plate thanks to the transformation of movement reailized by at least one intermediate link articulated on the main lever and acting directly or indirectly on one of the air-conditioning controls, characterized by the fact that the said main lever is in the general shape of a T the ends of the horizontal arm of which articulate on two links mounted so as to pivot on the plate about two fixed axes, that the articulations between the main lever and the links as well as the pivot axes of the said links are situated at the vertices of an isosceles trapezoid formed when the main lever is at the middle point of its travel when the vertical arm of the T is perpendicular to the plane of the front of the plate, and by the fact that the said isosceles trapezoid is inscribed in a semicircle of diameter corresponding to the distance between the pivot axes of the links, the said diameter being parallel to the front.

Thus, the entire travel of the main lever corresponds essentially to the diameter of the circle circumscribed about the deformable trapezoid, while the accessible end of the lever moves parallel to the front of the support and the articulations of the trapezoid permit significant reduction of the operating friction so as to realize very smooth control.

BRIEF DESCRIPTION OF THE DRAWINGS

Various other objects and many of the attandant advantages of the present invention will be readily appreciated as the same becomes better understood by reference to the following detailed description when considered in connection with the accompanying drawings, in which like reference characters designate the same or similar parts throughout the figures thereof and wherein:

Referring to FIG. 2, the control device is constituted essentially of a support plate 1 exhibiting at its forward edge a perpendicular front 2 intended to be mounted to the inside of an automobile dashboard. The front is slotted over most of its length to allow the tip of a main control lever 3 to pass through, terminating in a handle or knob 4. This knob constitutes a dressing of the end of the lever to alter the dangerous configuration reduce the aggressiveness of the latter and obey the safety norms. The main lever has the general shape of a T the ends of the horizontal arm of which (viewed as in FIG. 2) articulate on two links 5, 6 by means of two axes of articulation A, B, links themselves mounted so as to pivot on the plate 1 about two fixed axes D, C. It is seen that the pieces just described are symmetric in shape and are disposed symmetrically with respect to the principal axis 7 of FIG. 2 traversing the front 2 perpendicularly at its mid-point. It will be the same for the other pieces described below for this particular realization of the invention.

Figure 1:
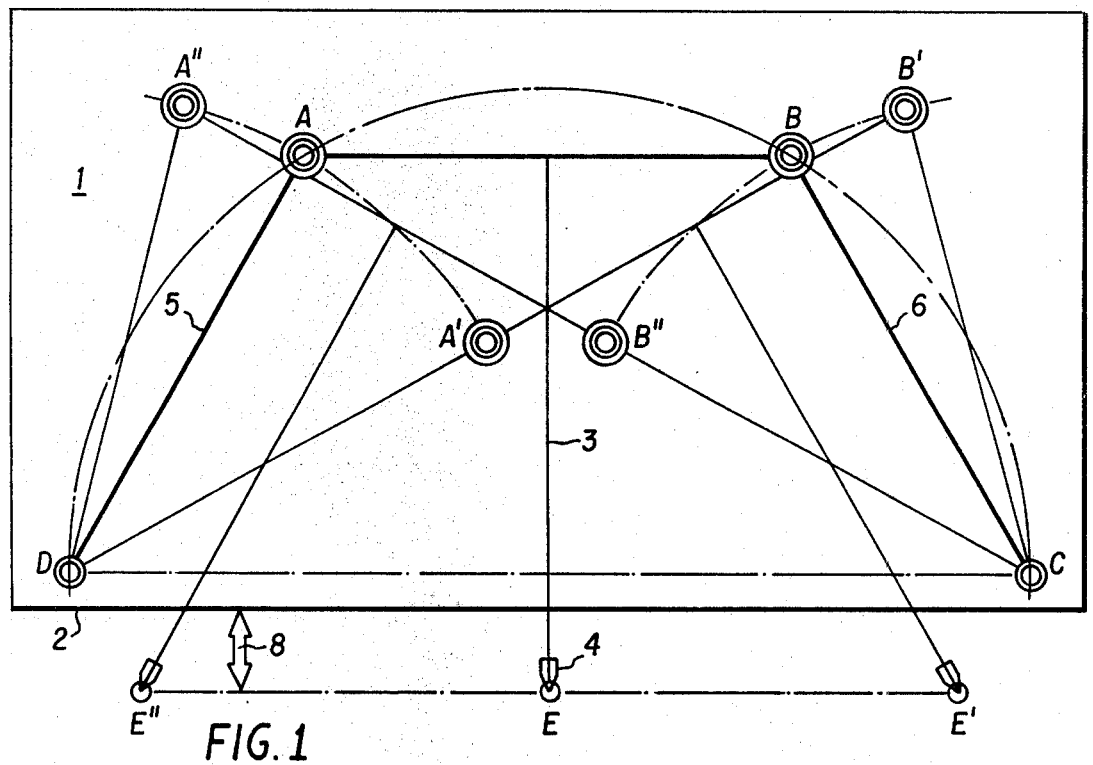
FIG. 1 represents schematically the principle of operation of the assembly articulated according to the invention.

According to the invention, when the main lever 3 is in the middle position E of its travel for which the vertical arm of the T is perpendicular to the plane of the front, i.e. coincides with the axis of symmetry 7 of the device, the articutations A, B between the said lever and the links as well as the pivot axes D, C of the said links are situated at the four vertices of an isosceles trapezoid A B C D, as represented schematically in FIG. 1. This trapezoid is inscribed in a semicircle the diameter DC of which, parallel to the front 2, corresponds to the distance between the pivot axes D, C of the links. Thus, when the control knob is displaced from the initial position E to the position E', for example, its trajectory remains parallel to the plane of the front 2 while the articulation axes A, B progressively take the respective positions A' and B' by the pivoting of the links 5, 6 following the circular trajectories AA', BB' represented in broken lines until the pivot axis D of link 5 farthest from the main lever 3 and the articulation axes A', B' are aligned. The same thing happens when the knob is moved from E to E'', the operation being symmetric. In this way the knob can move in a zone of projection 8 acceptable under the safety norms, while retaining a length of travel large relative to that of existing arrangements. In effect, the total travel corresponds essentially to the diameter CD of the circle circumscribed about the initial isosceles trapezoid ABCD, a travel greater than the length of the vertical arm of the T of the main lever 3.

Figure 2:
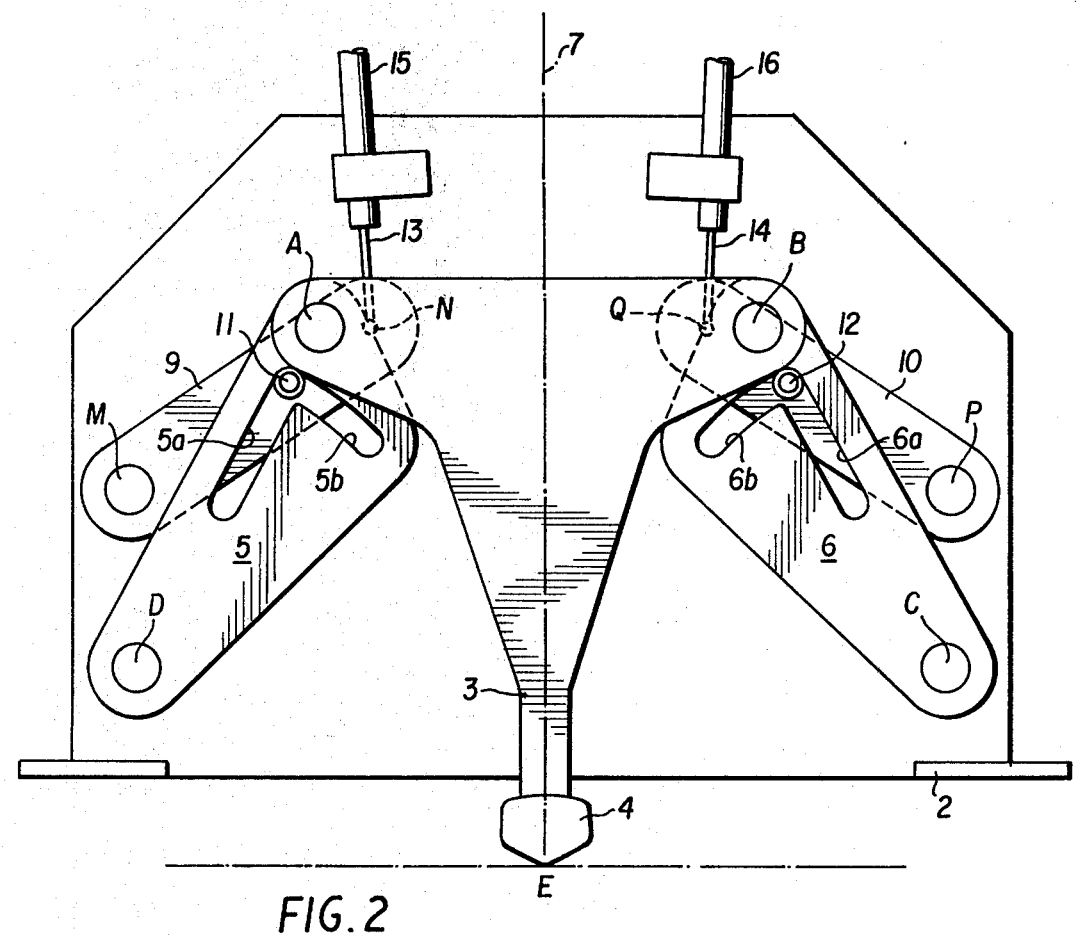
FIG. 2 is a plan view of a mode of realization of the multiple control device functioning according to the principle of FIG. 1 and showing the main control lever in the middle position of its travel.

Returning to FIG. 2, each link has two grooves (5a, 5b), (6a, 6b) essentially at right angles, machined into the side of the link 5, 6, possibly all the way through to become slots. These grooves permit each link to entrain a secondary lever 9, 10 mounted so as to pivot about a fixed axis M, P integral with the plate 1, by guiding in the said grooves a roller 11, 12 loosely mounted on the secondary lever 9, 10. This roller can suitably consist of a plastic sleeve slipped onto a peg projecting from the surface of the secondary lever, with the aim of reducing operating friction by the realization of this elementary bearing. The pivot axis M, P of each secondary lever is located on the perpendicular to the front 2 of the plate passing through the pivot axis D, C of the corresponding link. Keeping in mind the spacing between the aforementioned pivot axes and the stroke to give the secondary lever 9, 10, a number of configurations for the guide grooves in the link can be thought of. In the realization illustrated, a first groove 6a, 6a is straight and parallel to the line DA, CB between the pivot axis D, C of the link and its articulation axis A, B with the horizontal arm of the T-shaped main lever. A second groove 5b, 6b at right angles to the first follows a portion of the circle centered on the pivot axis D, C of the link and of radius lying between the said axes. Thus, when the main lever 3 is in its mid position E as shown in FIG. 2, the roller 11, 12 of the secondary lever is at the right angle of the guide grooves (5a, 5b), (6a, 6b) of the link. Finally, the ends of the secondary levers opposite their pivot axes act directly on the rods or cables 13, 14 of the controls 15, 16 intended to regulate the different functions of the air-conditioning, via the attachment points N and Q.

Figure 3:
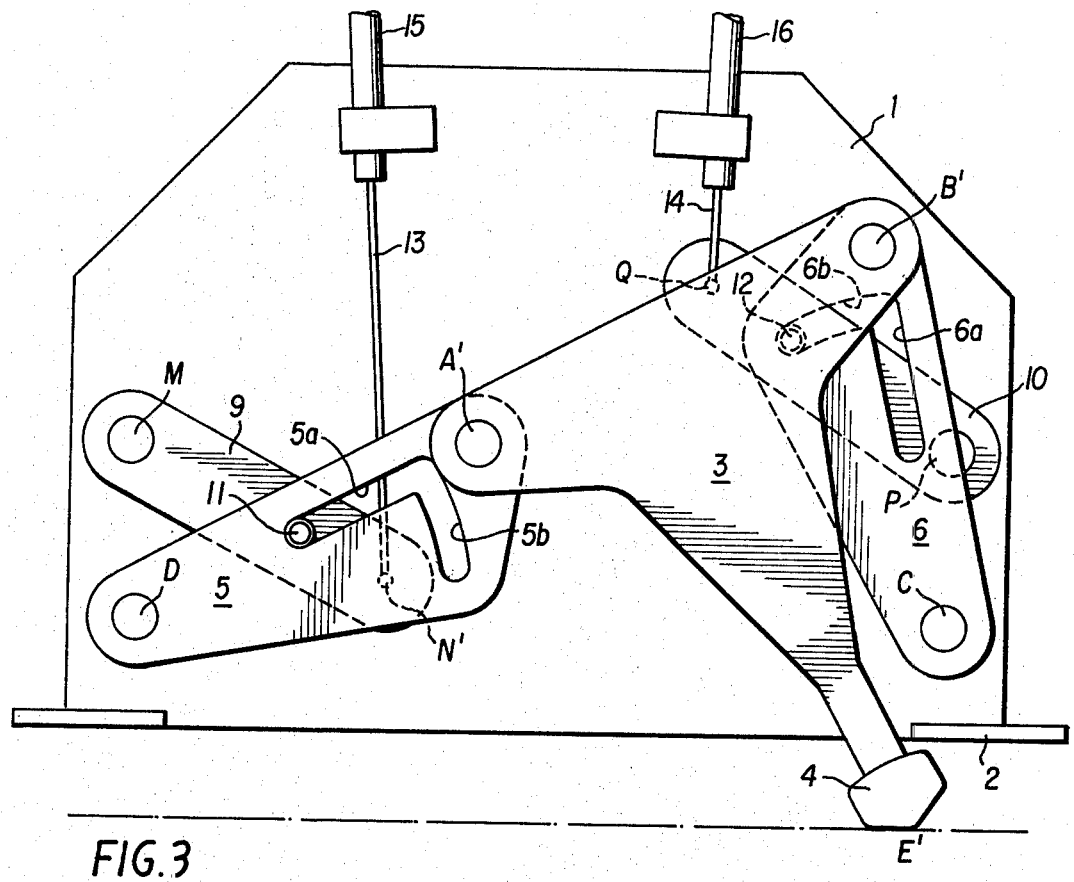
FIG. 3 shows the main lever in one of its extreme positions for which one control is actuated and another disengaged.
Figure 4:
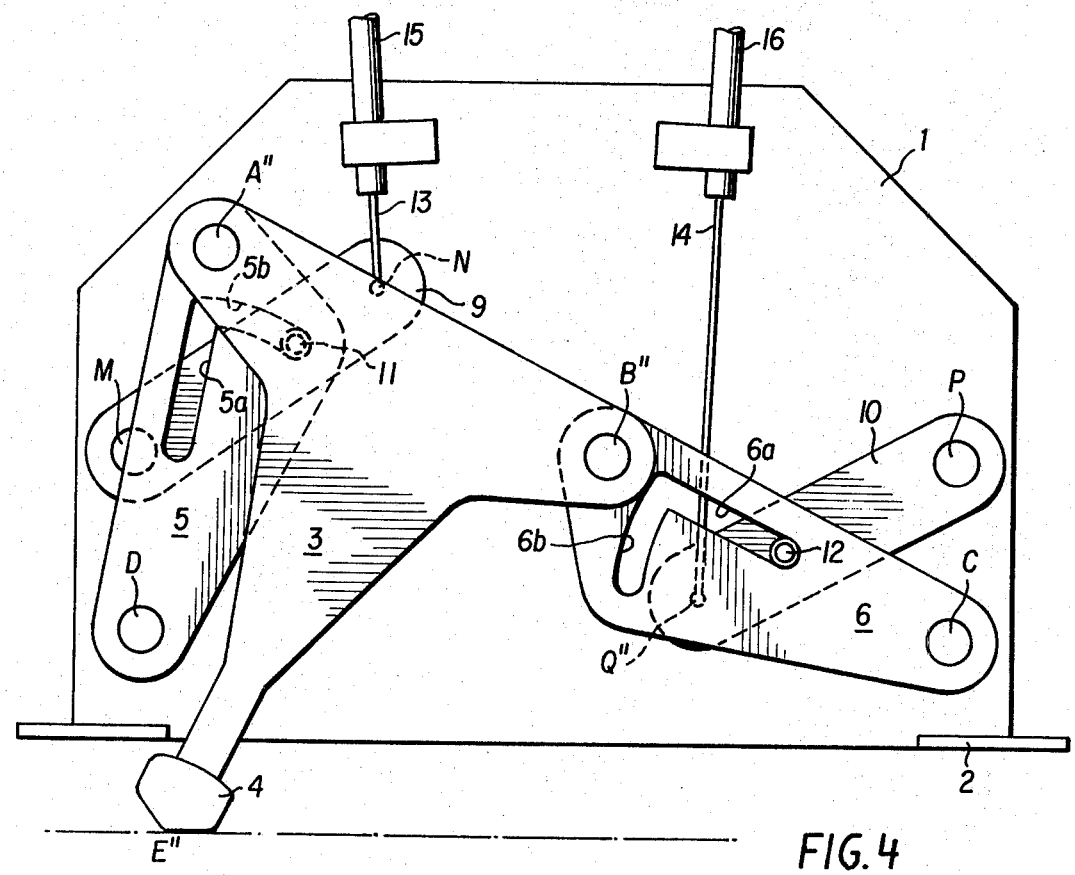
FIG. 4 shows the main lever in the other extreme position, symmetric to the preceding one.

The device operates as follows, with reference to FIGS. 2 and 3. When the operating knob 4 of the main lever is moved from E to E', parallel to the front, the initial isosceles trapezoid formed by the articulations A B C D deforms according to the principle of FIG. 1 in such a way that the articulation A moves to A' by the pivoting of the first link 5 about its axis D. At the same time, the first secondary lever 9 pivots on its axis M, entrained by its roller 11 guided in the straight groove 5a in link 5. The various trajectories represented by broken lines can be followed in FIGS. 2 and 3. Thus, the control attachment point N goes to N' and actuates the first control 15, called active. Meanwhile, the second link 6 has seen its articulation B displaced to B' under the action of its pivoting about C, while the second secondary lever 10 remains in its initial position thanks to the sliding of its roller 12 in the circular groove 6b of link 6. Thus, the control attachment point Q does not move and the second control 16 remains inactive. It can thus be seen that moving the main lever 3 in either direction from its middle position E causes only that secondary lever to pivot which it moves away from, since the device functions in a rigorously symmetric manner. It would therefore be superfluous to describe in detail the operation of the device corresponding to the transition from FIG. 2 to FIG. 4. We note simply that the reference points denoted by (') in FIG. 3 will be found in FIG. 4 with the denotation ('') corresponding to a new positioning of the parts. When the control knob of the main lever is moved from E' to E'' passing through its middle position E (FIGS. 3, 2, 4), the articulated assembly pushes back the first control 15 and leaves the second 16 unaffected for the first half of the travel (E'E), then pulls on the second control 16 while leaving the first 15 alone for the second half of the travel of the main lever 3. In this way the same lever acts successively on two controls in the course of its long distance of travel while remaining parallel in its motion to the front 2 of the plate.

It can further be seen that the main lever 3 pivots indirectly about either axis C or D through the intermediary of axis A or B.

Numerous variants of the described mode of realization are possible. Thus, in particular, the levers or links of the articulated assembly may act directly and simultaneously on the controls by a cable or rod regulating the air-conditioning functions. In the example of realization described, the cooperation of the roller 11, 12 with the straight groove 5a, 6a in the link constitutes a control cam. In the same way, there can easily be realized, without going beyond the bounds of the invention, other cam profiles satisfying the desired laws of regulation for various air-conditioning functions; it is also possible to actuate parts that are not symmetric or are disposed asymmetrically on the support plate.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. Manipulating arrangement with multiple function comprising a main lever able to indirectly pivot about at least one fixed axis integral with a support plate, the accessible end of which moves in an essentially parallel manner to the front of the said plate due to the transformation of motion realized by at least one intermediate link articulated on the main lever and acting at least indirectly on one of the air-conditioner controls, wherein said main lever 3 is in the general shape of a T, the ends of the horizontal arm of which articulate with two links 5, 6 mounted so as to pivot on the plate 1 about two fixed axes D, C, that the articulations A, B between the main lever and the links, as well as the pivot axes D, C of the said links, are situated at the vertices of an isosceles trapezoid ABCD formed when the main lever 3 is at the mid-position E of its travel so that the vertical arm of the T is perpendicular to the plane of the front 2 of the plate and by the fact that the said isosceles trapezoid is inscribed in a semi-circle of diameter corresponding to the distance between the pivot axes D, C of the links, the said diameter being parallel to the front 2, wherein each of said two links entrains one of two secondary levers mounted so as to pivot about one of two fixed axes M, P integral with the plate by means of one of two rollers 11, 12 fixed to one of said secondary levers and adapted to move in at least one guide groove machined in each of said two links 5, 6.

2. Arrangement as in claim 1, characterized by the fact that the articulated elements comprising the T-shaped main lever 3, the links 5, 6, the secondary levers 9, 10, the pivot axes D, C and articulation axes A, B and the regulating controls 15, 16 are disposed and function in a rigorously symmetric manner with respect to a principal plane 7 passing through the middle of the plate 1 and coinciding with the middle position E of the main lever as defined in claim 1.

3. Arrangement as in claim 1, characterized by the fact that each link has two guide grooves essentially at right angles, that the first groove 5a, 6a is straight and parallel to the line through the pivot axis D, C of the link and its articulation axis A,B with the horizontal arm of the T-shaped lever and by the fact that the second groove 5b, 6b follows a portion of the circle centered on the pivot axis D, C of the link and of a radius lying between the said axes.

4. Arrangement as in claim 1, characterized by the fact that the pivot axis M, P of the secondary lever is situated on the perpendicular to the front 2 of the plate passing through the pivot axis D, C of the link corresponding to the said secondary lever.

5. Arrangement as in claim 1, characterized by the fact that the roller 11, 12 of the secondary lever is situated at the right angle of the guide grooves (5a, 5b) (6a, 6b) in the link when the main lever 3 is in the middle position E of its travel.

6. Arrangement as in claim 1, characterized by the fact that the ends of the secondary levers opposite their pivot axis M, P act directly on the control rods 13, 14 intended for regulating the air-conditioning.

7. Arrangement as in claim 1, characterized by the fact that moving the main lever 3 in either direction from its middle position E causes only that secondary lever to pivot which the main lever moves away from, resulting in the actuation of a first control while the other secondary lever is left unmoved by the action of the circular groove 5b, 6c in the corresponding link and the second control remains unactivated.

8. Arrangement as in claim 1, characterized by the fact that the total distance of travel of the main lever corresponds essentially to the diameter DC of the circle circumscribed about the deformable isosceles trapezoid.

9. Arrangement as in claim 8, characterized by the fact that when the main lever occupies an outer position (E' or E") of its travel, the pivot axis (D or C) of the link farthest from this position and the two articulation axes A, B of the main lever are aligned.

* * * * *